Oct. 3, 1950  R. F. ONSRUD  2,524,232
MILLING CUTTER

Filed Feb. 11, 1948  2 Sheets-Sheet 1

INVENTOR
RUDOLPH F. ONSRUD
BY Rummler, Rummler & Snow
ATTORNEYS

Oct. 3, 1950 R. F. ONSRUD 2,524,232
MILLING CUTTER
Filed Feb. 11, 1948 2 Sheets-Sheet 2

INVENTOR
RUDOLPH F. ONSRUD
BY Rummler, Rummler & Snow
ATTORNEYS

Patented Oct. 3, 1950

2,524,232

UNITED STATES PATENT OFFICE 2,524,232

MILLING CUTTER

Rudolph F. Onsrud, Chicago, Ill., assignor to Onsrud Machine Works, Inc., Chicago, Ill., a corporation of Illinois Application February 11, 1948, Serial No. 7,641

7 Claims. (Cl. 29—106)

This invention relates to milling cutters and particularly to rotating milling cutters designed for high speed operation.

The main objects of this invention are to provide an improved rotary milling cutter; to provide such a device having improved means for lubrication of the faces and cutting edges of the cutting tips; to provide such a milling cutter having self-lubricating means operable in both vertical and horizontal mills; and to provide an improved lubricating means for high speed rotary milling cutter which will automatically distribute lubricant over the faces and cutting edges of the cutting tips during operation and at a rate determined automatically by the speed of cutter rotation.

A specific embodiment of this invention is shown in the accompanying drawings in which.

Figure 1:
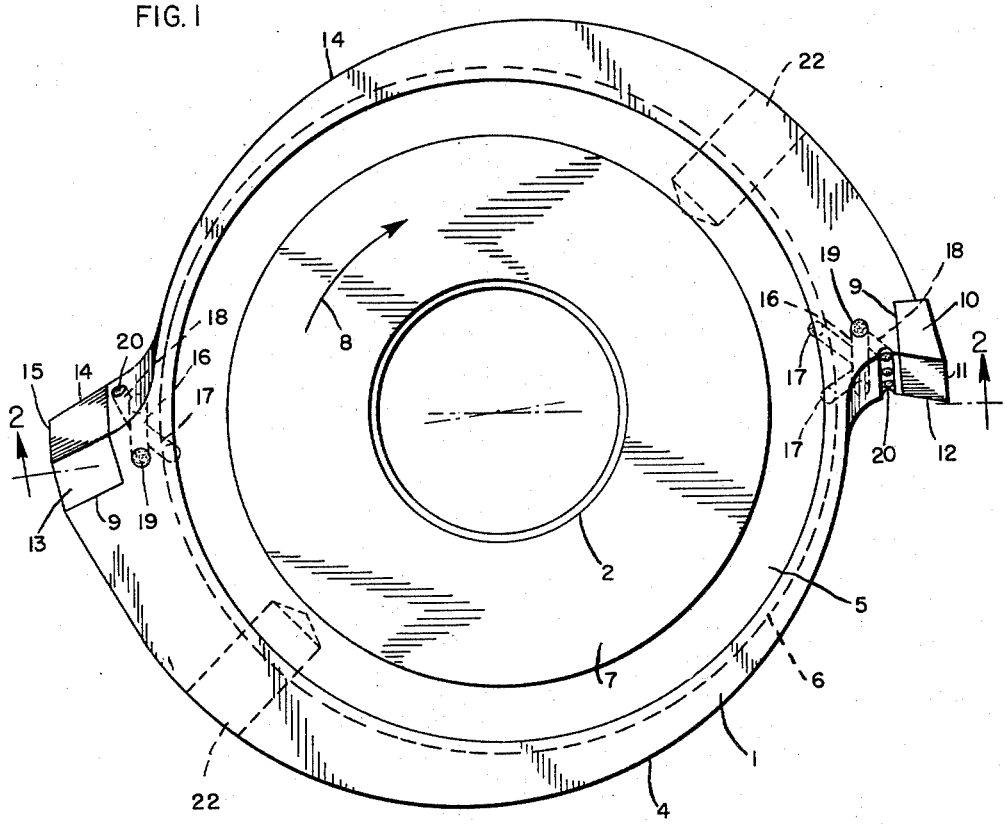
Figure 1 is a top plan view of the improved milling cutter.

In the form shown in the drawings, the improved milling cutter comprises a solid substantially annular or disc-like body 1 having a central opening or bore 2, internally threaded as at 3, for mounting on a cutter spindle and having a plurality of cutter blades mounted on its periphery. The body is arranged so that its greatest diameter is across opposing cutter blades and the radius of the periphery is gradually reduced between the cutter blades in the direction opposite the direction of rotation so that the outline of the cutter periphery from blade to blade follows a substantially involute path, as shown at 4 in Fig. 1.

Each face of the cutter body is provided with an annular channel 5, the outer wall of which is somewhat undercut outwardly to form an annular groove opening toward the body axis as at 6, and the upper side of the cutter body is provided with an annular shoulder or hub portion 7 which serves to space the cutter body from the end of the spindle on which it is mounted.

As shown, the cutter blades are oppositely disposed on the periphery of the body 1, and are secured fast in square-sided seats 9 cut transversely in the periphery of the body. The cutter blades are also inclined downwardly in the direction of rotation of the cutter, the direction of rotation being indicated by the arrow 8 in Fig. 1.

Figure 2:
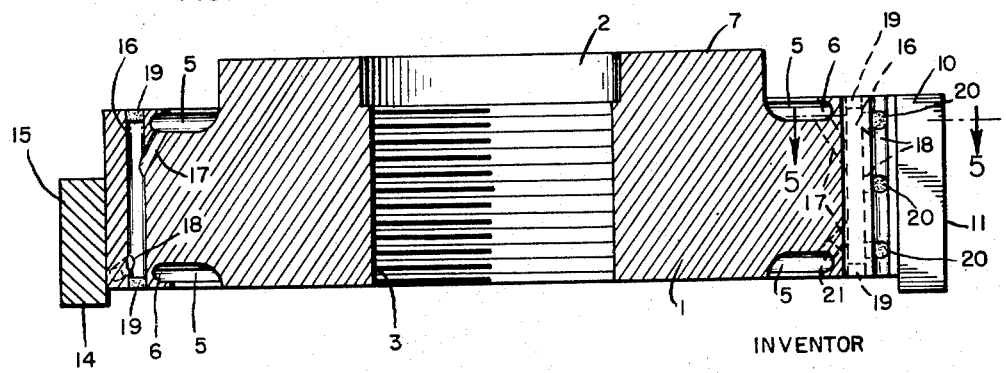
Fig. 2 is a sectional view of the same as taken on line 2—2 of Fig. 1.
Figure 3:
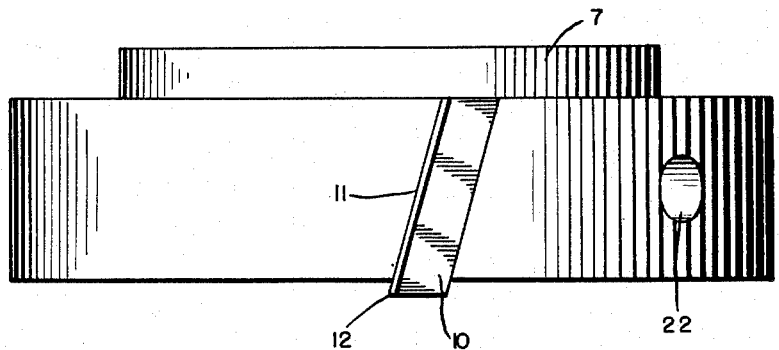
Fig. 3 is a side elevation of the same showing the arrangement of the radial cutting blade which performs the principal milling operation.
Figure 4:
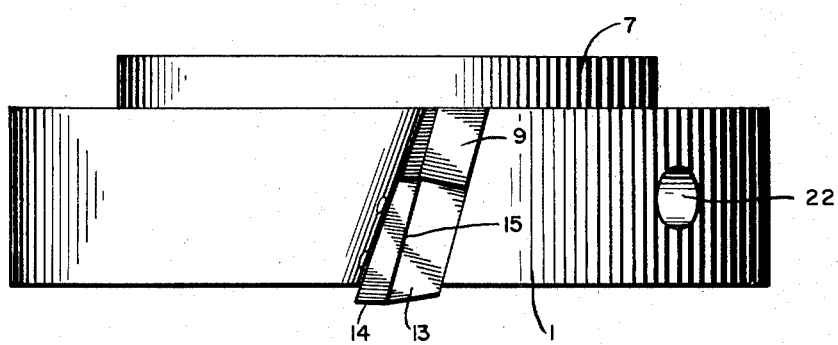
Fig. 4 is a side elevation of the same showing the arrangement of the fly cutter blade which performs a finish cut by a face milling operation.
Figure 5:
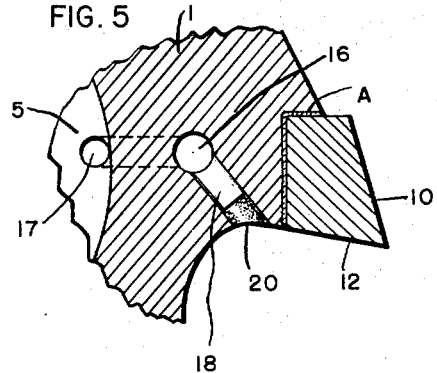
Fig. 5 is an enlarged fragmentary sectional detail as taken on line 5—5 of Fig. 2.

The principal cutting operation, whereby most of the metal to be milled is removed, is done by a radial cutter blade 10 made of tungsten carbide and secured fast in its seat 9 by hydrogen atmosphere copper brazing as indicated at A in Fig. 5. The cutting edge 11 of this blade extends transversely of the body periphery substantially in the direction of the axis of the cutter body. The blade 10 also projects beyond the bottom or outer face of the cutter body as shown in Figs. 2 and 3 so that the cutter body will amply clear the surfaces of the work being milled, and the end or transverse cutting edge 12 is inclined rearwardly at an angle of about 10° from a plane through the cutter axis and the leading or lower tip of the cutting edge 11.

The opposite or fly cutting blade 13 is also made of tungsten carbide and is secured in its seat 9 by means of hydrogen atmosphere copper brazing. The function of this blade is to perform a face milling operation and its cutting edge is the bottom edge 14 which lies in a plane normal to the cutter axis. The outer edge 15 of the blade 13, which extends in the direction of the cutter axis, is arranged so that its radial distance from the body center line is less than the radial distance of the outer edge 11 of the opposite blade 10, the difference in the distances being approximately .030 inch.

The face milling edge 14 of the fly cutting blade 13 is inclined forwardly from its extremity, in the direction of rotation of the cutter, at an angle of about 30° relative to a plane including the axis of the cutter body and the outer extremity of the cutting edge 14. Also, the cutting edge 14 projects beyond the bottom or end of the cutter body 1 a distance slightly greater than the projection of the radial cutting blade 10, the difference being substantially .010 inch.

Thus, in operation of the cutter blades, the radial cutter blade 10 removes most of the material to be milled but leaves a slight amount for a finish cut, and the fly cutter blade 13 makes the finish cut by a face milling operation. The preferred speed of the cutter is in the neighborhood of 5400 R. P. M., and a relatively high rate of cutter feed can thus be obtained and still accomplish a fine finish having an extremely high degree of flatness on the surface being milled. In practice a surface finish of micro inch R. M. S. 5 is obtained with a surface flatness approximating that of precision blocks.

Lubrication for the cutting blades of the improved rotary cutter is had by delivering oil in small quantities to the leading faces of the cutter blades where, by centrifugal force the oil is spread across the faces to the cutting edges. Delivery of this lubricating oil is obtained through drilled passages leading from the peripheral surface of the cutter, adjacent the inner edge of the cutter blade faces, to the body end channels 5 where oil or other suitable lubricant is fed from a sight feed cup, not shown.

In the case of each cutter blade, the drilled passage is formed by first providing a bore 16 drilled through the body of the cutter adjacent its periphery, near the cutter blade and outside of the channels 5, in a direction parallel with the outer edge of the cutter blade. A diagonal passage 17 is then drilled from each of the channels 5 in to the bore 16, the passages 17 sloping from the channels 5 toward the center of the peripheral surface of the cutter.

Finally, a plurality of axially spaced, substantially radial passages 18 are drilled from the peripheral surface of the cutter, adjacent the inner edge of the faces of the cutter blades, into the bore 16. The ends of the bore 16 are then closed by means of solid plugs 19 and the ends of the passages 18 at the peripheral surface of the cutter body are blocked by means of porous plugs 20 which are of a material that will allow the lubricant to seep through at the rate of only a few drops per minute under the pressure developed by the centrifugal force of rotation.

As shown in Fig. 2, the inclined drill holes 17 leading from the end channels 5 to the bore 16 open into the channels 5 in the undercut portion 6. Thus lubricant supplied to the channels 5 is caused to flow to the undercut portion 6, by the centrifugal force produced by rotating the cutter, where it will pass through the drilled hole 17 into the bore 16. Such lubricant, upon filling the bore 16, is then, by centrifugal force, caused to enter the axially spaced passages 18 leading to the faces of the cutter blades and to pass slowly through the porous plugs 20 from where it is spread across the face of each of the cutter blades to the cutting edges. The lubricant is thus distributed evenly over the faces of the cutter blades, so that the friction between the chips and the cutter blades is reduced, and to the cutting edges where the lubricant is most needed to minimize the heat generated by the cutting action.

When the improved cutter is operated with its axis in a vertical position, the ends of the lower passages 17 opening into the bottom face channel 5 are plugged, as at 21 in Fig. 2, since only the upper face channel 5 would be employed to supply the lubricant. In those cases where the cutter axis would be in a horizontal position the lubricant could be supplied to both face channels, or to either one, and the plugs 21 would be omitted.

It will thus be seen that with this lubricating arrangement for the improved cutter, the lubricant can be easily fed to the face channels 5 from which, by centrifugal force, the lubricant is caused to flow to the periphery of the cutter body, the porous plugs 20 automatically regulating the flow of lubricant so that only the necessary amount passes to the faces and edges of the cutter blades according to the speed of rotation and the centrifugal force thereby produced.

The porous plug method of regulating lubricant flow is known to those skilled in the art and such persons would readily understand the construction and nature of these plugs.

The radial openings 22 in the cutter body, as shown in the drawings, are for the insertion of a suitable tool to tighten the cutter body on the spindle on which the cutter is mounted when in use.

The main advantages of the improved cutter construction reside in its arrangement whereby automatic or self-lubrication of the cutter blades is obtained on a substantially solid cutter head; and in the arrangement of the cutter blades and improved means for lubrication thereof whereby a single milling pass of the cutter head will produce a finished milled surface having a high degree of flatness.

Other advantages are to be found in the simple construction of the cutter and in the arrangement whereby a radial cutting blade and a fly-cutter blade, incorporated in a single high speed cutter body or head, are both automatically and efficiently lubricated. And still further advantages are to be found in the provision of a self-lubricating cutter which automatically supplies a lubricant at the point of contact between the work and the tool, in either vertical or horizontal milling operations, at a rate determined by the speed of operation.

Although but one specific embodiment of this invention is herein shown and described, it will be understood that numerous details of the construction shown may be altered or omitted without departing from the spirit of the invention as defined by the following claims.

I claim:

1. A milling cutter comprising a disc-like body arranged to be mounted on a rotatable spindle and having a peripherally mounted cutting blade, an annular channel formed in an end face of said body and adapted to receive a liquid lubricant, a passage leading from said channel to the periphery of said body adjacent the leading face of said cutting blade, and a porous plug in said passage adapted to pass lubricant under the influence of centrifugal force when said body is rotated.

2. A milling cutter comprising a disc-like body arranged to be mounted on a rotatable spindle and having a peripherally mounted cutting blade, an annular channel formed in an end face of said body and adapted to receive a liquid lubricant, the outer wall of said channel being undercut to form an inwardly opening groove, a passage leading from said groove to the periphery of said body adjacent the leading face of said cutting blade, and a porous plug in said passage adapted to pass lubricant under the influence of centrifugal force when said body is rotated.

3. A milling cutter comprising a disc-like body arranged to be mounted on a rotatable spindle and having a peripherally mounted cutting blade, an annular channel formed in an end face of said body, and adapted to receive a liquid lubricant, an axially extending bore in said body adjacent said cutting blade, said bore having its ends closed, a passage leading from said channel into said bore, a plurality of axially spaced radial passages leading from said bore to the periphery of said body adjacent the leading face of said cutting blade, and a porous plug in each of said radial passages adapted to pass lubricant under the influence of centrifugal force when said body is rotated.

4. A milling cutter comprising a substantially annular body arranged to be mounted on a spindle and having a peripherally mounted axially extending cutting blade, an annular channel formed in each end face of said body, the outer wall of each channel being undercut to form an annular groove, an axially extending bore in said body adjacent said cutting blade, said bore having its ends closed, a passage leading from each of said grooves into said bore, a plurality of axially spaced radial passages leading from said bore to the periphery of said body adjacent said cutting blade, and a porous plug in each of said radial passages.

5. A high speed milling cutter comprising a substantially annular body arranged to be mounted on a rotatable spindle and having a pair of oppositely disposed axially extending cutter blades secured on its periphery, one of said blades being a radial cutter and the other blade being a fly cutter, said blades each projecting axially beyond one end face of said body, an annular channel formed in the other end face of said body and adapted to receive a fluid lubricant, a pair of passages in said body each leading from said channel to the periphery of said body adjacent the leading face of a respective blade, and a porous plug at the outer end of each passage adapted to permit the flow of lubricant therethrough when said body is rotated.

6. A high speed milling cutter comprising a substantially annular body arranged to be mounted on a rotatable spindle and having a pair of oppositely disposed axially extending cutter blades secured on its periphery, one of said blades being a radial cutter and the other blade being a fly cutter, said blades each projecting axially beyond one end face of said body, an annular channel formed in each end face of said body and adapted to receive a fluid lubricant, an axially extending bore in said body adjacent each of said blades, each of said bores having its ends closed, passages in said body connecting each channel with each of said bores, a plurality of axially spaced radial passages leading from each bore to the periphery of said body adjacent the leading face of the respective blade, and a porous plug in each of said radial passages.

7. A milling cutter comprising a disk-like body adapted to be mounted on a rotatable spindle and having a cutting blade projecting axially beyond one end face, an annular channel formed in an end face of said body and adapted to receive a liquid lubricant, said channel being spaced radially from the axis of said body a lesser distance than said cutter and the outer wall of said channel being undercut to form a peripheral groove, a passage leading from said groove to the surface of said body adjacent the leading face of said cutting blade, and a porous plug in said passage adapted to pass lubricant under the influence of centrifugal force when said body is rotated.

RUDOLPH F. ONSRUD.

REFERENCES CITED

The following references are of record in the file of this patent:

UNITED STATES PATENTS

| Number | Name | Date |
|---|---|---|
| 2,080,401 | Heard | May 18, 1937 |
| 2,140,838 | Hart | Dec. 20, 1938 |
| 2,309,409 | Miller | Jan. 26, 1943 |
| 2,350,019 | Dexter | May 30, 1944 |